INVENTOR
ERWIN L. SCHMIDT
JOSEPH L. SCHWABE
BY
Wheeler, Wheeler & Wheeler
ATTORNEYS Patented Mar. 30, 1943

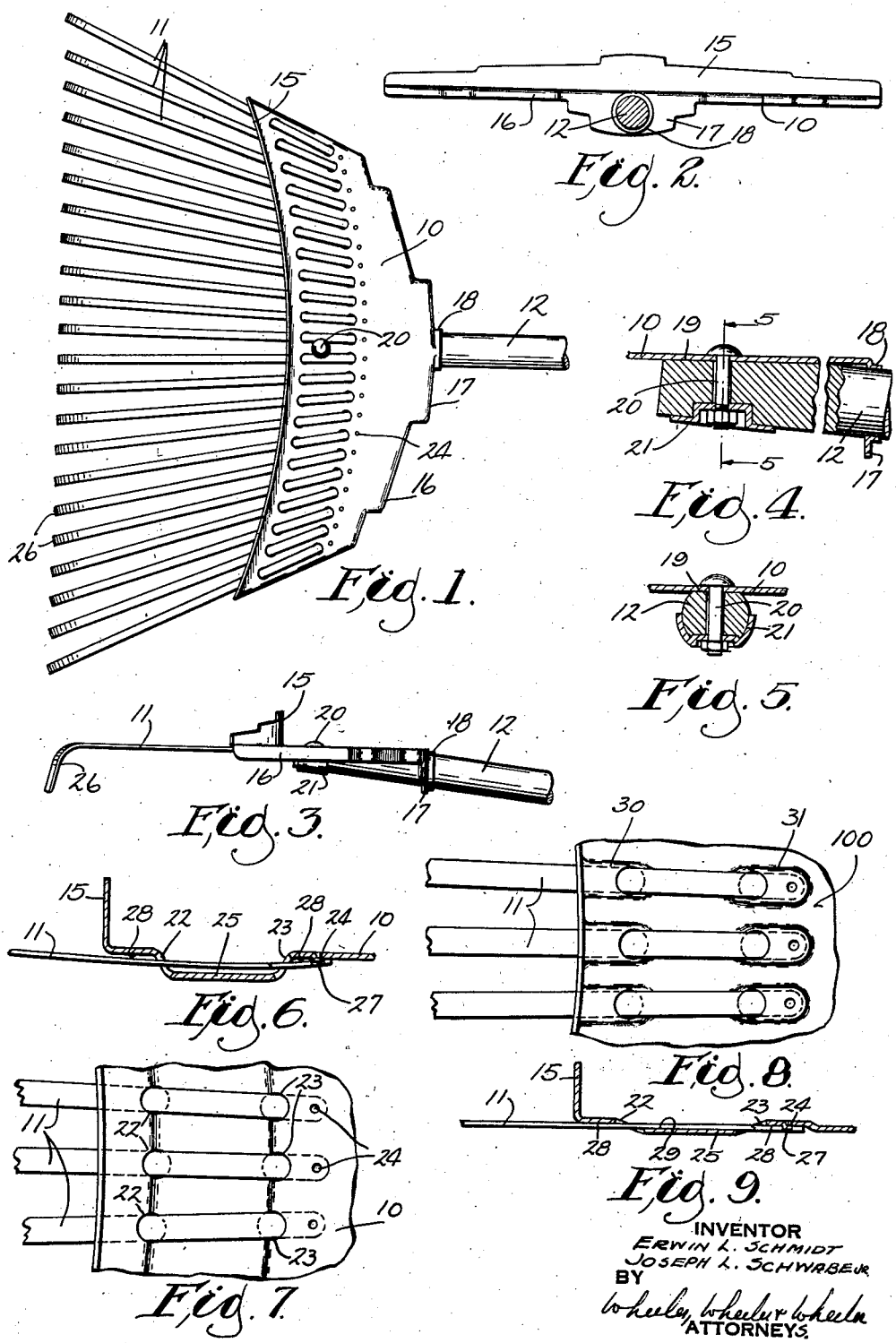

2,315,021

UNITED STATES PATENT OFFICE 2,315,021

LAWN RAKE AND METHOD OF MANUFACTURE THEREOF

Erwin L. Schmidt and Joseph L. Schwabe, Jr., Milwaukee, Wis., assignors to G-H Specialty Company, Milwaukee, Wis., a corporation of Wisconsin Application July 26, 1940, Serial No. 347,604

16 Claims. (Cl. 56—400.17)

This invention relates to improvements in lawn rakes and methods of manufacture thereof.

One of the primary objects of the invention is to provide a novel improved and simplified form of lawn rake which will not only produce a stronger and better and more easily usable rake than has heretofore been available, but will permit economies in the costs of material and manufacture.

It is a further object of the invention to provide a lawn rake construction in which, regardless of the angle at which the broom-type rake is held by the operator in position for use, the points of all of the rake teeth will simultaneously contact the ground.

Another specific object of the invention is to provide a rake in which the anchorage of the several teeth in the sheet metal back or support is accomplished by a deformation of the back or support rather than the teeth whereby it is possible to use for the teeth a light weight strip of steel having a temper better adapted for use in a rake tooth than would be possible if it were necessary to bend the tooth backwardly and forwardly in anchoring it to the support. The method and means by which the teeth are positioned in the support constitute important features of the present invention. Another object of the invention has to do with the formation of the tooth support and its connection with the handle, whereby a lightweight piece of sheet metal is adequately reenforced to provide essential strength and at the same time is so formed that only a single bolt or rivet is required for the rigid mounting of the handle thereon.

Other objects of the invention will be apparent to those skilled in the art upon examination of the accompanying drawings and the following disclosure of the invention.

In the drawings:

Fig. 1 is a view in plan of a rake head embodying this invention, the handle being only fragmentarily illustrated.

Fig. 2 is a view in end elevation of the rake head shown in Fig. 1, the handle being shown in section.

Fig. 3 is a side elevation of the rake head shown in Fig. 1.

Fig. 4 is an enlarged detailed view taken in section longitudinally of the handle and fragmentarily illustrating a corresponding section of the rake head to show the manner of fastening the handle thereto.

Fig. 5 is a view taken in section on line 5—5 of Fig. 4.

Fig. 6 is a view fragmentarily illustrating the rake head and a tooth in a section longitudinally of a tooth prior to the deformation of the rake head for anchoring the tooth therein, this view also being on an enlarged scale as compared with Figs. 1, 2 and 3.

Fig. 7 is a plan view of the parts shown in Fig. 6.

Fig. 8 is a view similar to Fig. 7 showing a modified embodiment of the invention.

Fig. 9 is a view similar to Fig. 6 showing the structure of Fig. 8 as it appears in section when the mounting head has been deformed to anchor the individual teeth therein.

Like parts are identified by the same reference characters throughout the several views.

Figure 10:
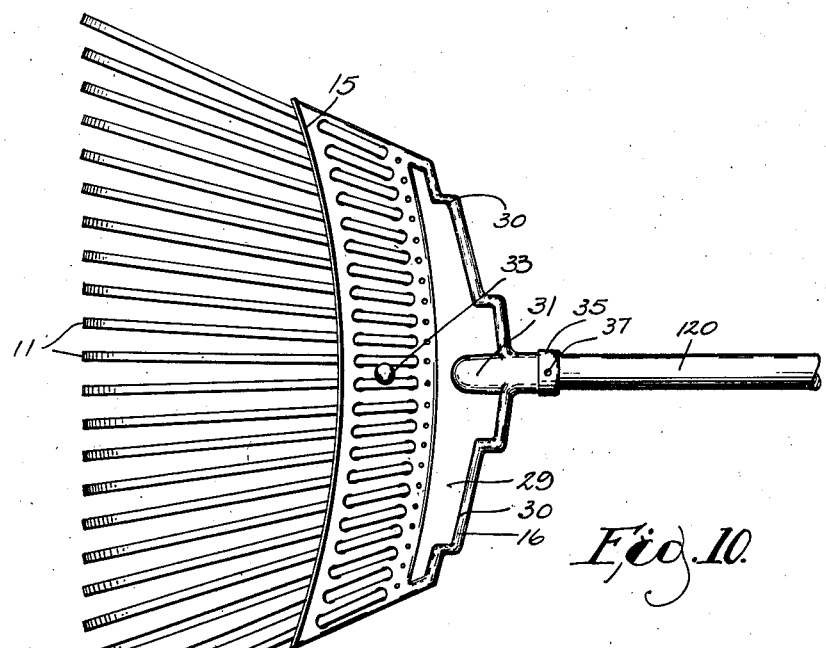
Fig. 10 is a view similar to Fig. 1 showing a modified and preferred embodiment of the invention.

In the broom-type lawn rake which embodies the present invention, a sheet metal mounting head 10 supports the several teeth 11 and is carried by a handle 12 usually made of wood and somewhat similar to a broom handle. In order that the mounting head may be made very light and at the same time may be sufficiently strong to perform its function, it is preferably marginally flanged. Along the margin from which the teeth 11 project, the mounting head has an upstanding flange at 15 which may be arcuate, as indicated in Fig. 1, in its aspect in plan and may be of ornamental design in elevation, as indicated in Figs. 2 and 3. Another flange 16 is continuous along its end and back margins as best shown in Figs. 2 and 3, preferably having an ornamental contour. At 17 the flange 16 is enlarged and is annularly reenforced at 18 to provide a socket into which a handle 12 is received in the manner shown in Fig. 4. On its upward side, the handle is beveled at 19 to provide a surface which lies flat against the under side of the mounting head 10 and is held thereto by a bolt 20, preferably engaged in a fitting 21 for which a notch is provided in the side of the handle opposite its flat face 19, as shown in Figs. 4 and 5. Thus a single fastening bolt (for which a rivet or the like may be substituted if desired) will rigidly anchor to the mounting head 10 the end of the handle which is otherwise fixed in the sleeve 18 which is integral with flange enlargement 17.

When the mounting head is initially manufactured, it is first punched with inner and outer rows of holes 22 and 23 and integral bosses 24 beyond the outer row of holes 23 and is then channeled at 25 in such a way that the sides of the channel include the rows of holes 22 and 23, respectively. Into the registering holes 22 and 23 at opposite sides of the channel, are inserted the several teeth 11, each of which may, if desired, be provided with a broad curve 26 at its end and each of which is preferably punched with an aperture at 27 engageable over the lug or boss 24 as a means of positioning the tooth.

With all the teeth in place crossways of the channel 25 in the opposite apertures 22 and 23 of the mounting head, the mounting head is then flattened out in the manner shown in Fig. 9 so that the channel becomes as nearly nonexistent as the thickness of the respective teeth permits. Those portions of the side walls of the channel in which the apertures 22 and 23 were located were originally more nearly vertical than horizontal, as shown in Fig. 6. Following the flattening operation, these side wall portions of the channel become more nearly horizontal than vertical and each tooth, without being in any way necessarily deformed, is clamped between the lower surface portions 28 of the mounting head and that surface 29 of the mounting head which originally was the bottom of the channel. Moreover, due to the change in angularity of the sides of the channel, the margins of the holes 22 and 23 are clamped upon the respective teeth. Thereby the teeth are firmly fixed against any twisting displacement from their fixed positions and the interlocking engagement of each tooth with one of the bosses 24 of the mounting member 10 effectively restrains the tooth against longitudinal displacement.

So effective is the position of the teeth by this means that it is not necessary to employ the modified embodiment of the invention more specifically shown in Figs. 8 and 9 wherein the surfaces of the mounting head 100 are additionally channeled at 30 and 31 longitudinally of the respective teeth.

In many lawn rakes of this type previously manufactured, the teeth have had to be sharply hooked or bent in order to fasten them to the mounting head. Where such sharp bending is required, the teeth must either be tempered after being bent or must be made of very expensive material or must sacrifice resilience. In the construction of the present invention, the teeth are preferably straight pieces of strip stock except for the optional curve at their free ends at 26. They may, if desired, be deformed in the course of mounting them in the head, but such deformation of the teeth is not essential. It will be noted that the teeth of our improved rake are not parallel, but are angularly related so as to provide a desirable spread or flare of the teeth beyond the length of the mounting itself. Yet all of the teeth end in the same plane and all are of the same length. This desirable result is accomplished by disposing the mounting holes in an arcuate series as shown in Fig. 1 and Fig. 10. The arc is so chosen that despite the increasing angularity of successive teeth, the ends of the teeth will all fall in the same straight line. In consequence of this arrangement, they will all contact the ground uniformly and with substantially uniform pressure regardless of the angle at which the handle is held. In this respect, our improved rake differs from any other rake on the market, none of which secure any such result with teeth of uniform length.

Figure 11:
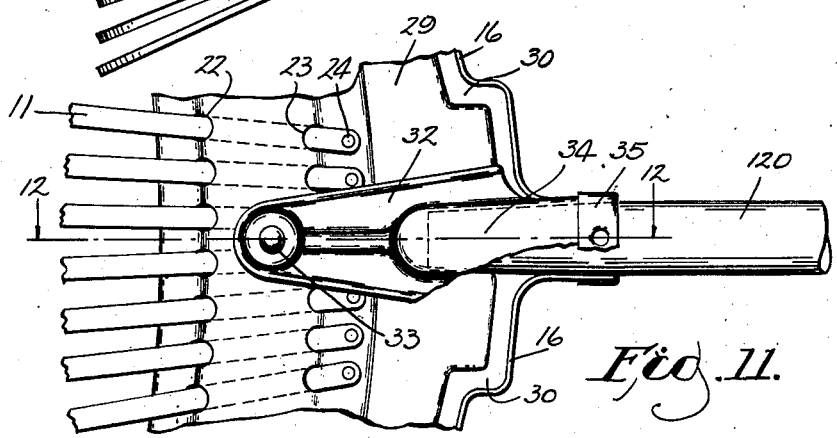
Fig. 11 is a fragmentary detail view on an enlarged scale showing the reverse side of the structure shown in Fig. 10.
Figure 12:
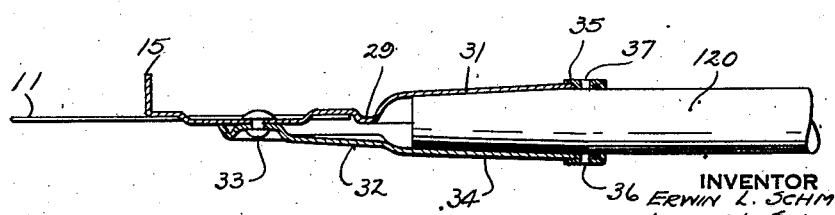
Fig. 12 is a fragmentary detail view taken in section on the line 12—12 of Fig. 11.

The preferred construction shown in Figs. 10, 11 and 12 has all of the advantages of the rake above described and, in addition, the mounting head is strengthened and improved in appearance by the bodily offset of the planiform portion 29 immediately within the marginal flange 16. This leaves a bead 30 along the top edge of the rake immediately adjacent the flange.

The portion of the rake along its upper surface is embossed upwardly at 31 to provide half of a tapered handle socket. The remaining half is provided by a central piece 32 applied to the under side of the rake and held thereto by the rivet 33. The lower half of the handle socket is provided with an embossed portion 34 of the separate piece 32. The complementary half handle sockets 31 and 34 are embraced by a ferrule 35 which is anchored in place by punching opposite portions of its periphery at 36 and 37 into the metal of the handle socket portions 31 and 34. The punching not only unites the ferrule to the half socket elements 31 and 34, but also provides holes through which nails or screws may be introduced into the tapered end of the wooden handle 120, if desired.

We claim:

1. The method of manufacturing a rake of the character described which comprises aperturing a piece of mounting head stock at spaced points along predetermined rows, deforming such stock adjacent the apertures of one row to provide bosses, deforming said stock to provide a channel so located that the sides of the channel include the portions of the stock wherein said rows of apertures are formed, leaving the bosses laterally adjacent the channel, providing holes adjacent the ends of metal teeth, inserting said teeth into the apertures of the channeled portion of the stock with the holes of the teeth in registry with said bosses, and flattening the channeled portion of the stock to engage the bosses in the holes of the teeth and to clamp the teeth in the apertures of the stock.

2. A rake of the character described comprising the combination with teeth provided with holes adjacent their inner ends, of a sheet metal mounting plate provided with deformed bosses engaged in the holes of the respective teeth and having spaced apertures through which the respective teeth are laced, the margins of said stock about said apertures being in confining engagement with the individual teeth projecting through such apertures.

3. A method of rake manufacture which comprises punching holes in the ends of flat spring strips adapted to constitute teeth for the rake, punching in sheet metal mounting head stock holes in spaced rows, punching in said stock bosses in a row adjacent the rearmost row of holes, forming in said stock a channel of such dimensions and disposition that the portions of the stock comprising the side walls of the channel are the portions in which said apertures are punched, leaving the bosses laterally spaced from one of the channel side walls, inserting into the holes at opposite sides of the channel the several strips to comprise the teeth while engaging the holes in the ends of such strips upon the respective bosses, and flattening the channel portion of the mounting head stock toward the level of that portion thereof in which the bosses are formed whereby to secure the respective teeth upon said bosses and to confine the respective teeth in the apertures of said stock against lateral displacement and to clamp said teeth substantially rectilinearly between opposed faces of said stock provided respectively by the upper surface of said stock at the bottom of the channel and the lower surface of said stock at each side of the channel.

4. A rake of the character described comprising the combination with a series of flat spring teeth having corresponding end portions free and other end portions apertured, said teeth being substantially straight adjacent their apertured end portions, of a mounting head comprising a sheet metal plate having integral bosses engaged in the apertures at the inner ends of the respective teeth and having a shallow channel with side walls provided with holes through which said teeth project substantially rectilinearly from said bosses, portions of the upper and lower surfaces of said plate being in clamping engagement with the teeth at the bottom of the channel and at opposite sides thereof respectively.

5. In a rake of the character described, the combination with a mounting head having a channel and a face to which said channel opens, said channel including side wall portions provided with opposing apertures, of a flange upstanding from said base of the head along one margin of the head adjacent a side wall portion of the channel, teeth individually projecting across the channel through holes in the opposite side wall portions thereof, each such tooth having a resilient free end portion projecting beyond said flange, portions of said head at and adjacent said channel being in clamping engagement with the respective teeth to position them in said apertures, and a marginal flange projecting from the face of the head opposite to that to which said channel opens, said last mentioned flange being disposed on marginal portions of the head other than the margin from which said first mentioned flange projects.

6. A rake of the character described comprising the combination with rake teeth, of a mounting head having a hollow channel with opposite side portions provided with opposing apertures in which said teeth are respectively positioned to span said channel, portions of said head including said channel being deformed into clamping engagement with the respective teeth and portions of said head along the path of the respective teeth being recessed to receive such teeth.

7. In a rake of the character described, the combination with a series of teeth of substantially uniform length having slight angular relation whereby said teeth flare at their free ends, of a mounting head having means supporting said teeth in positions such that their free ends fall substantially in the same plane, said mounting means being disposed arcuately upon said head and engaging the teeth at corresponding points thereon.

8. In a rake of the character described, the combination with a series of teeth of substantially uniform length having their ends disposed in substantial alignment, said teeth being angularly related whereby said ends flare, of a mounting head provided with apertured portions engaging the respective teeth, said apertured portions being disposed in arcuate series whereby to accommodate the angular disposition of teeth at the same length while maintaining the free ends of said teeth at substantially the same extension.

9. In a device of the character described, the combination with a series of divergent teeth having their free ends extending to substantially the same transverse line, of a mounting head provided with means for individually engaging the respective teeth at corresponding points, said tooth engaging means of the mounting head being disposed in an arcuate series and said teeth being substantially of uniform length.

10. A method of making a rake which comprises providing spaced rows of circular apertures in a plate comprising a mounting head, channelling the mounting head along the rows of apertures leaving substantially flat portions of the mounting head extending laterally from the channel and offsetting from said portions the bottom web of the channel, the apertures being disposed in opposite walls of the channel immediately adjacent said flat portions, inserting teeth through the apertures in the opposing walls of the channel, and flattening the channel of the mounting head to move said offset web toward a position of transverse alignment with the flat portions of the mounting head and into pressure engagement with the lower surfaces of said teeth, the upper surfaces of said teeth being clamped thereby against the lower surfaces of the flat mounting head portions, and the apertured walls being flattened into oblique positions respecting the teeth, whereby the margins of said apertures crampingly confine said teeth.

11. A rake of the character described comprising the combination with a set of teeth each comprising substantially straight mounting shank and a downwardly curved outer end, of a mounting head having a shallow channel downwardly formed and provided with flaring apertured side walls through which the shanks of the respective teeth extend, said mounting head having the top surface of the bottom of said channel and the bottom surfaces of the mounting head laterally adjacent the channel in clamping engagement with the bottom and top faces of the shank portion of each tooth as a means of fastening the shank portion in the mounting head, one of the bottom surfaces of the mounting head adjacent the channel overlying the respective teeth as they project from the mounting head.

12. A rake of the character described comprising the combination of a mounting plate provided with a handle and having a downwardly formed shallow channel transversely disposed respecting the handle, said channel including side walls apertured immediately adjacent the lower surface of the plate and also including a bottom web between said side walls with an upper surface slightly below the level of the lower surfaces of adjacent portions of the plate, and a set of spring teeth having downwardly curved ends and substantially straight shanks, said shanks extending across the channel and through apertures in opposite side walls thereof and being clamped between the top surface of the channel web and the bottom surface portions of the plate laterally adjacent the channel.

13. The rake of claim 12 in which the ends of the shanks of said teeth are apertured and the portions of the said plate laterally adjacent the channel are downwardly deformed to provide bosses engaged in the apertures of the said teeth.

14. The rake of claim 12 in which the channel extends arcuately across the mounting plate, the concave side of the arc being directed away from the handle, the apertures in which the teeth have their shanks positioned being so located as to maintain said teeth mutually divergent, all of the teeth being of the same length and anchored at corresponding points in said channel, the arcuate curve of the channel being just sufficient to compensate for the divergence of the teeth and to maintain all of said teeth with their curved end portions in substantially the same transverse line irrespective of such divergence.

15. A rake of the character described comprising the combination of a mounting plate, a set of mutually divergent teeth having shank portions anchored in the mounting plate and having their ends flaring, said teeth being of uniform length and having their said ends terminating in a substantially straight transverse line, said mounting plate having apertures in two rows in which the shanks of the respective teeth are clampingly engaged at corresponding points on said shanks, the apertures of the outer row being more widely spaced than the apertures of the inner row, whereby to maintain said tooth divergence and the rows of apertures having sufficient arcuate curvature to compensate for such divergence while maintaining the ends of the teeth in transverse alignment.

16. The rake structure defined in claim 12 in which the apertures in the channel walls are circular and the said walls are oblique respecting the teeth shanks whereby the curvilinear margins of the walls at the apertures are crampingly engaged with the sides of the shanks of the respective teeth.

ERWIN L. SCHMIDT.
     JOSEPH L. SCHWABE, Jr.